(12) United States Patent
Jurlina et al.

(10) Patent No.: US 11,390,392 B2
(45) Date of Patent: Jul. 19, 2022

(54) RUNNING/CHASING LIGHTS FOR EVACUATION SYSTEMS

(71) Applicant: Air Cruisers Company, LLC, Wall Township, NJ (US)

(72) Inventors: Thomas A. Jurlina, Wall Township, NJ (US); Kelly Svihla, Robbinsville, NJ (US); Robert W. Hentges, Brick, NJ (US)

(73) Assignee: AIR CRUISERS COMPANY, LLC, Wall Township, NJ (US)

(*) Notice: Subject to any disclaimer, the term of this patent is extended or adjusted under 35 U.S.C. 154(b) by 0 days.

(21) Appl. No.: 16/951,410

(22) Filed: Nov. 18, 2020

(65) Prior Publication Data
US 2021/0147090 A1 May 20, 2021

Related U.S. Application Data

(60) Provisional application No. 62/937,140, filed on Nov. 18, 2019.

(51) Int. Cl.
| | |
|---|---|
| *B64D 25/14* | (2006.01) |
| *G08B 7/06* | (2006.01) |
| *G08B 5/38* | (2006.01) |
| *B64D 47/02* | (2006.01) |
| *A62B 1/20* | (2006.01) |
| *F21S 10/06* | (2006.01) |
| *F21W 107/30* | (2018.01) |

(52) U.S. Cl.
CPC ............. *B64D 25/14* (2013.01); *B64D 47/02* (2013.01); *F21S 10/063* (2013.01); *G08B 5/38* (2013.01); *G08B 7/066* (2013.01); *A62B 1/20* (2013.01); *B64D 2203/00* (2013.01); *F21W 2107/30* (2018.01)

(58) Field of Classification Search
CPC .. G08B 5/38; G08B 7/066; A62B 1/20; B64D 25/14; Y10S 244/905
See application file for complete search history.

(56) References Cited

U.S. PATENT DOCUMENTS

| | | |
|---|---|---|
| 6,928,213 B2 | 8/2005 | Neuberger |
| 6,998,960 B2 | 2/2006 | Buschmann et al. |
| 7,018,079 B1 | 3/2006 | Franco-Vila et al. |
| 8,952,828 B2 | 2/2015 | Kohlmeier-Beckmann et al. |
| 9,626,846 B2 | 4/2017 | Kohlmeier-Beckmann et al. |
| 10,160,551 B2 | 12/2018 | Hartman et al. |
| 10,562,637 B2 | 2/2020 | Hartman et al. |
| 2014/0009274 A1* | 1/2014 | Kohlmeier-Beckmann ................. A62B 3/00 340/425.5 |
| 2016/0027266 A1* | 1/2016 | McDonagh ............ G08B 7/066 340/815.4 |
| 2016/0167794 A1* | 6/2016 | Kohlmeier-Beckmann ................. A62B 1/20 182/18 |
| 2016/0167795 A1* | 6/2016 | Kohlmeier-Beckmann ................. B64D 25/14 182/48 |

(Continued)

*Primary Examiner* — Alexander K Garlen
(74) *Attorney, Agent, or Firm* — Kilpatrick Townsend & Stockton LLP (57) ABSTRACT

A lighting system for use with evacuation systems for aircraft during emergency situations. The lighting system has a chasing or running light rhythm that provides the image of lights moving down the system to help provide clarity to the evacuees about the direction of descent.

15 Claims, 10 Drawing Sheets

(56) References Cited

U.S. PATENT DOCUMENTS

| | | | |
|---|---|---|---|
| 2016/0171848 A1* | 6/2016 | Kohlmeier-Beckmann | ................ B64D 47/02 340/945 |
| 2019/0150248 A1* | 5/2019 | Leegate | ................ B64D 47/02 307/9.1 |
| 2019/0291880 A1* | 9/2019 | McBurnett | ............ B64D 25/14 |
| 2020/0262580 A1* | 8/2020 | Palaniappan | ............ F21S 9/024 |

* cited by examiner

RUNNING/CHASING LIGHTS FOR EVACUATION SYSTEMS

This application claims the benefit of U.S. Provisional Application Ser. No. 62/937,140, filed Nov. 18, 2019 titled "Running/Chasing Lights for Evacuation Systems," the entire contents of which are hereby incorporated by reference.

FIELD OF THE DISCLOSURE

According to certain embodiments of this disclosure, there is provided a lighting system for use with evacuation systems, such as evacuation slide, evacuation ramp, evacuation ramp/slide, and evacuation slide/raft systems (referred to herein collectively as "evacuation systems") for aircraft during emergency situations. The lighting system has a chasing or running light rhythm that provides the image of illumination/lights moving down the evacuation system to help provide clarity to the evacuees about the direction of descent.

BACKGROUND

Federal aviation safety regulations require aircraft to provide evacuation and other safety provisions that allow evacuation of passengers and crew members after an emergency landing. These safety provisions include evacuation slides, evacuation ramps, evacuation ramp/slides, evacuation slide/rafts (some evacuation slides are also useable as life rafts, after evacuation has been completed), life rafts, life vests, and other life-saving inflatable devices. All of these options are generally referred to herein as "inflatable devices" or "evacuation systems."

Inflatable evacuation systems are typically located at emergency exits of the aircraft. In use, a person leaving the aircraft typically steps or jumps onto an evacuation slide or ramp and then slides or moves down the slide surface in order to reach the ground or other evacuation surface.

An evacuation of a passenger aircraft must take place within regulatory time limits, which consider the maximum number of passengers on the aircraft, the number of exit doors (taking into account that not all exit doors may be accessible after the emergency landing), and the amount of time required to evacuate all passengers and crew members. If an evacuation occurrence takes place at night or in any other low-lighting condition, evacuees using evacuation slide systems may not fully understand the way they should approach an evacuation slide for descent. For example, evacuees may be reluctant to move as quickly as necessary and required. Hesitation by evacuees can reduce evacuation flow rates of passengers in an emergency evacuation of the aircraft, which can be problematic. These hesitations can create time delays that can cost lives.

Current lighting systems for these types of evacuation systems does not convey direction or instruction to evacuees. The lights are simply provided for illumination purposes only, and do not provide directional advice or direction. The lighting systems also fail to provide any benefit during daylight conditions. Accordingly, improvements to various types of emergency evacuation lighting systems are desirable.

SUMMARY

Accordingly, the present inventors have designed improved lighting systems that help clarify for evacuees the direction for descent. The use of illuminating running or chasing lights and/or directional markings can help increase evacuation flow rates by reducing hesitation of evacuees and increasing their confidence and willingness at the door threshold to approach and use the evacuation system. This can increase the flow through the exit and onto the evacuation system.

The terms "invention," "the invention," "this invention," "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Figure 1:
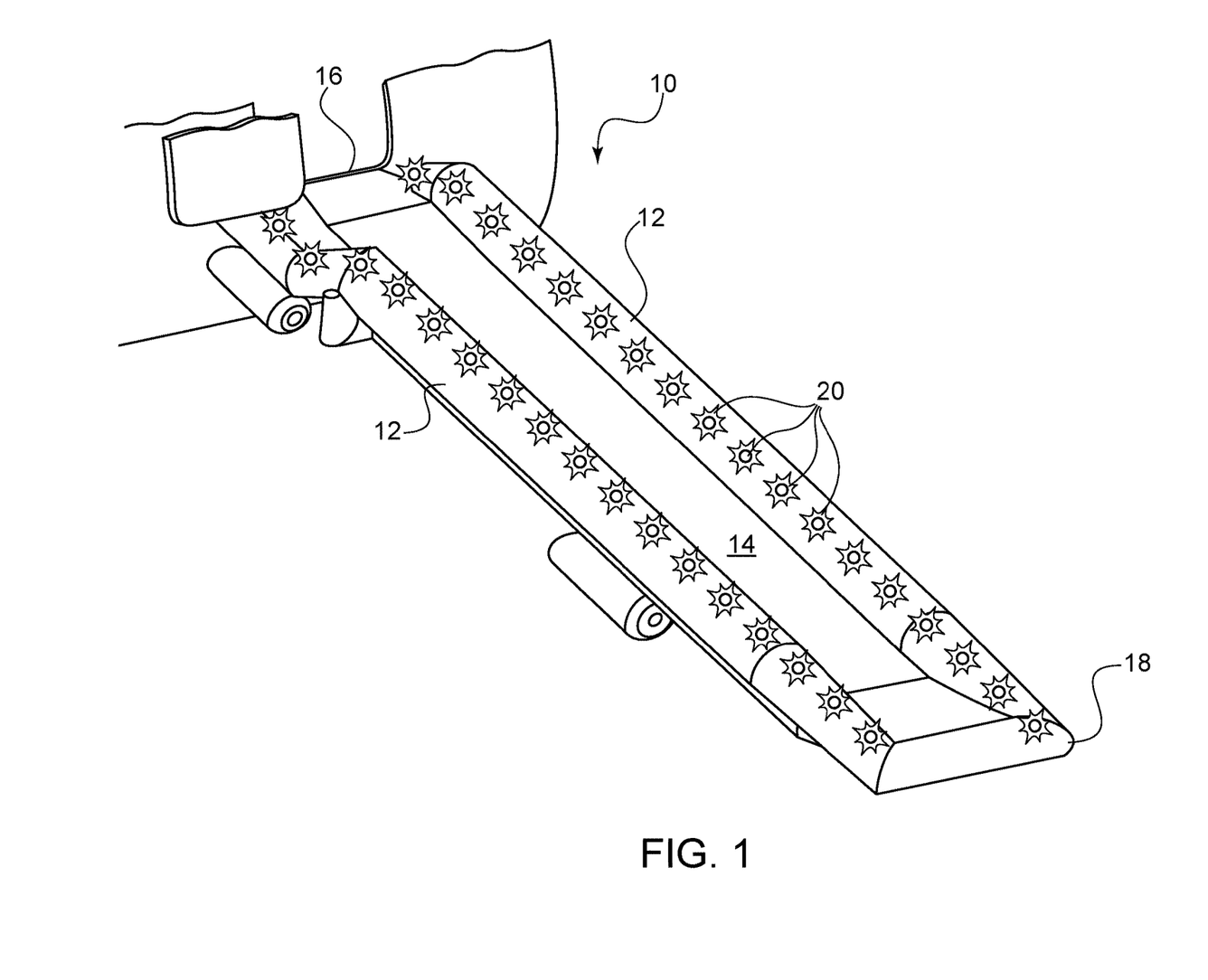
FIG. 1 is a perspective view of an evacuation slide with a series of chasing lights extending down both side tubes.

Hesitation by evacuees to traverse an evacuation slide may occur at the top of the evacuation slide when it is not clear where the slide direction may be, especially for evacuation slides that have a cant slide angle and/or a raised porch area that may not be fully clear from the evacuees' perspective. This problem can be exacerbated when the evacuation occurs in the dark. Evacuees cannot always see the entirety of the slide or the end of the slide, and this creates uncertainty about jumping onto the slide. Accordingly, embodiments of the present disclosure provide systems that are designed to provide descent direction for aircraft evacuees by incorporating "running" or "chasing" lights on an evacuation slide. These lights may be sequentially blinking lights that are timed to give the illusion that the lights are "running" down the slide or "chasing" one another down the slide. The lights are designed to flash brightly and quickly in sequential order. FIG. 1 illustrates an exemplary evacuation system 10, which in these figures, is shown as an evacuation slide. (As discussed above, the evacuation system may be an evacuation slide, an evacuation ramp, an evacuation ramp/slide, or an evacuation slide/raft system.) In the various embodiments disclosed herein, the running lights may be positioned along the side tubes 12, along the sliding surface 14, at the sill end 16, at the runway end 18, along a porch, along a walking surface, along a ramp that leads to a sliding surface, or any combination thereof. Providing a chasing light rhythm can help provide clarity to the evacuee about the direction of the slide descent, helping to direct the evacuee where to jump to traverse the slide, which can increase evacuation flow rates.

In one example, the chasing lights may be a string of adjacent lights (e.g. LEDs) mounted into or on the side tubes 12 and/or sliding the surface 14. The lights can cycle on and off frequently (approximately every 0.5 seconds) to give the illusion of the lights moving along the length of the slide. The lights may have a one-direction running pattern heading toward the runway end 18 of the slide. It is possible to provide several separate circuits of lights (channels) that are used to create a chase effect/simulation of motion achieved by turning the circuits ON and OFF in sequence.

It is possible for embodiments to have lights positioned along each body side tube 12 of the evacuation system 10. It is also possible for embodiments to have lights positioned along the sliding surface 14 of the evacuation system 10. In a further embodiment, it is possible to have lights positioned along each body side tube 12 and along the sliding surface 14 of the evacuation system 10.

Figure 2:
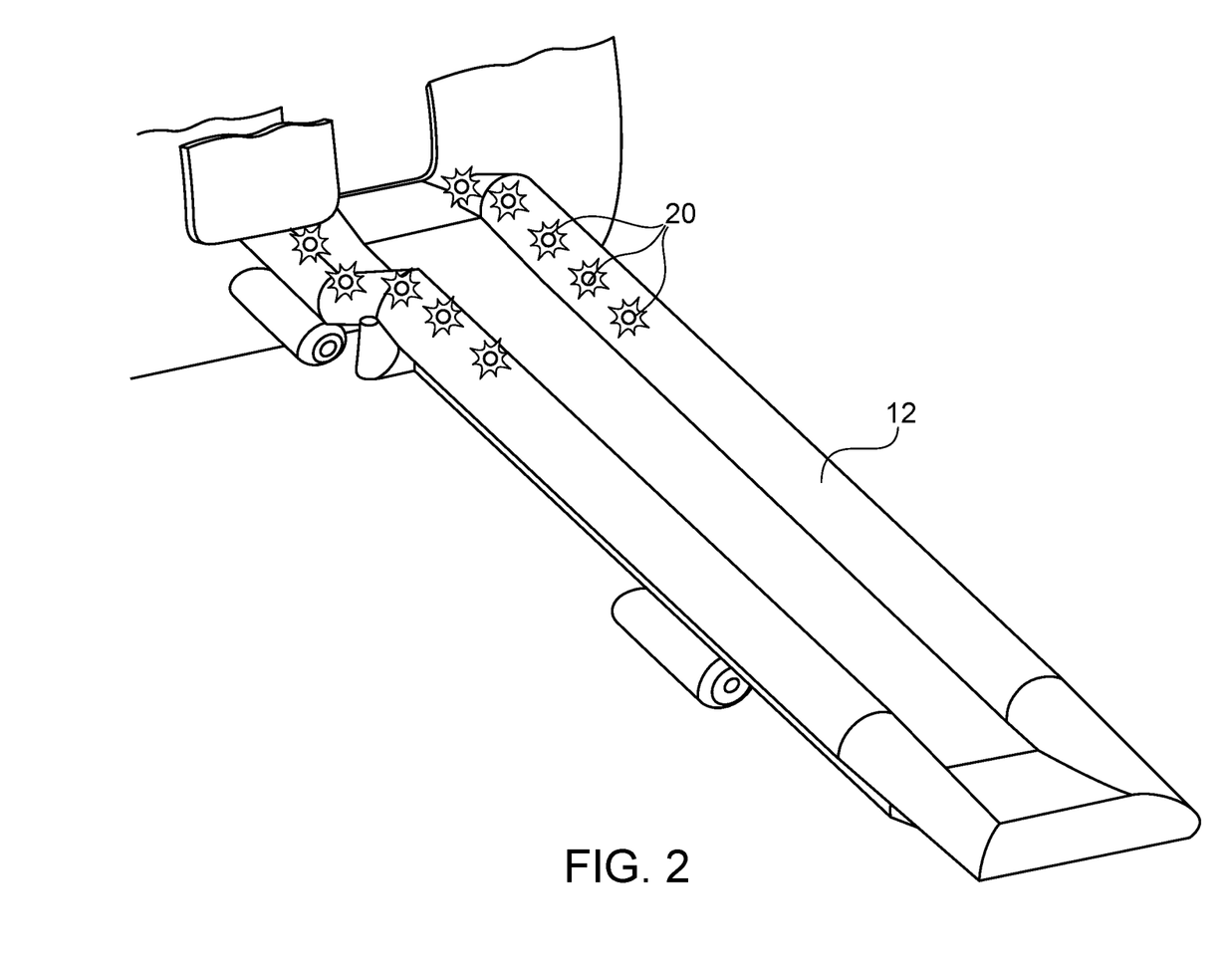
FIG. 2 is a perspective view of an evacuation slide with a series of chasing lights extending down only a portion of both side tubes.
Figure 3:
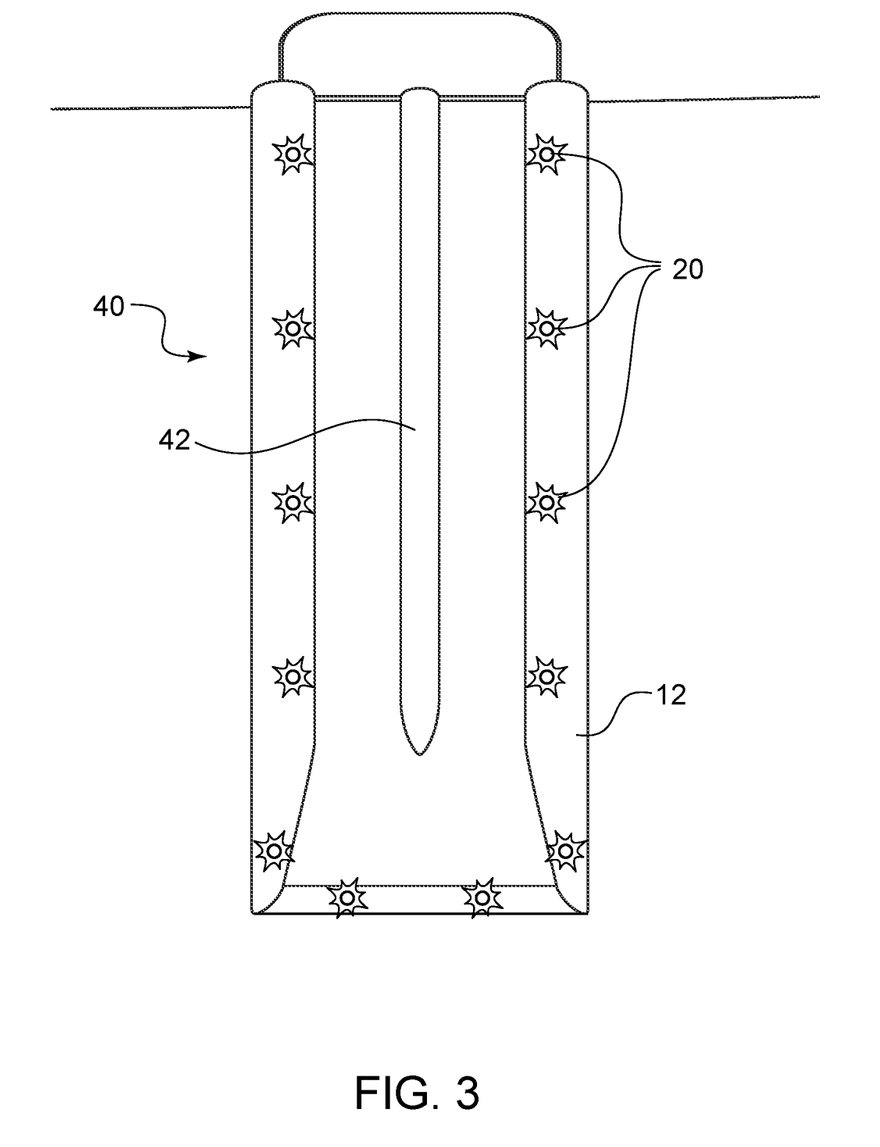
FIG. 3 is a perspective view of a dual lane evacuation slide with a series of chasing lights extending down both side tubes.

In one embodiment illustrated by FIG. 1, the running/"moving" lights 20 may be positioned along the side tubes 12 of the evacuation system 10. The lights 20 may be positioned external to the tubes 12, internal to the tubes 12, or both. Lights 20 may be positioned on a single side tube, but it has been found most beneficial to provide lights 20 along both of the side tubes 12, giving the illusion of a tunnel or channel that the evacuee will traverse. The lights 20 can be programmed to flash in sequential order from the sill end 16 to the runway end 18, providing visual cues to the evacuees as to the path and direction they are to take along the entire evacuation system 10. In one example, the lights 20 may flash more quickly at the entry/sill end 16 of the slide and slow their flashing speed at the exit/runway end 18 of the evacuation system 10. It is also possible to provide lights that flash in different colors at different times. It is also possible to provide lights 20 along only a portion of the slide. For example, lights 20 may be provided at the entry/sill end 16 and not continue all the way to the exit/runway end 18 of the slide 10. This example is illustrated by FIG. 2. FIG. 3 illustrates a dual lane evacuation slide 42 with lane lights 20 positioned along the side tubes 12. Although not shown, it is also possible to provide lights on the divider 42 of the dual slide, to indicate that two sliding surfaces are available for two passengers to use at the same time.

Figure 4:
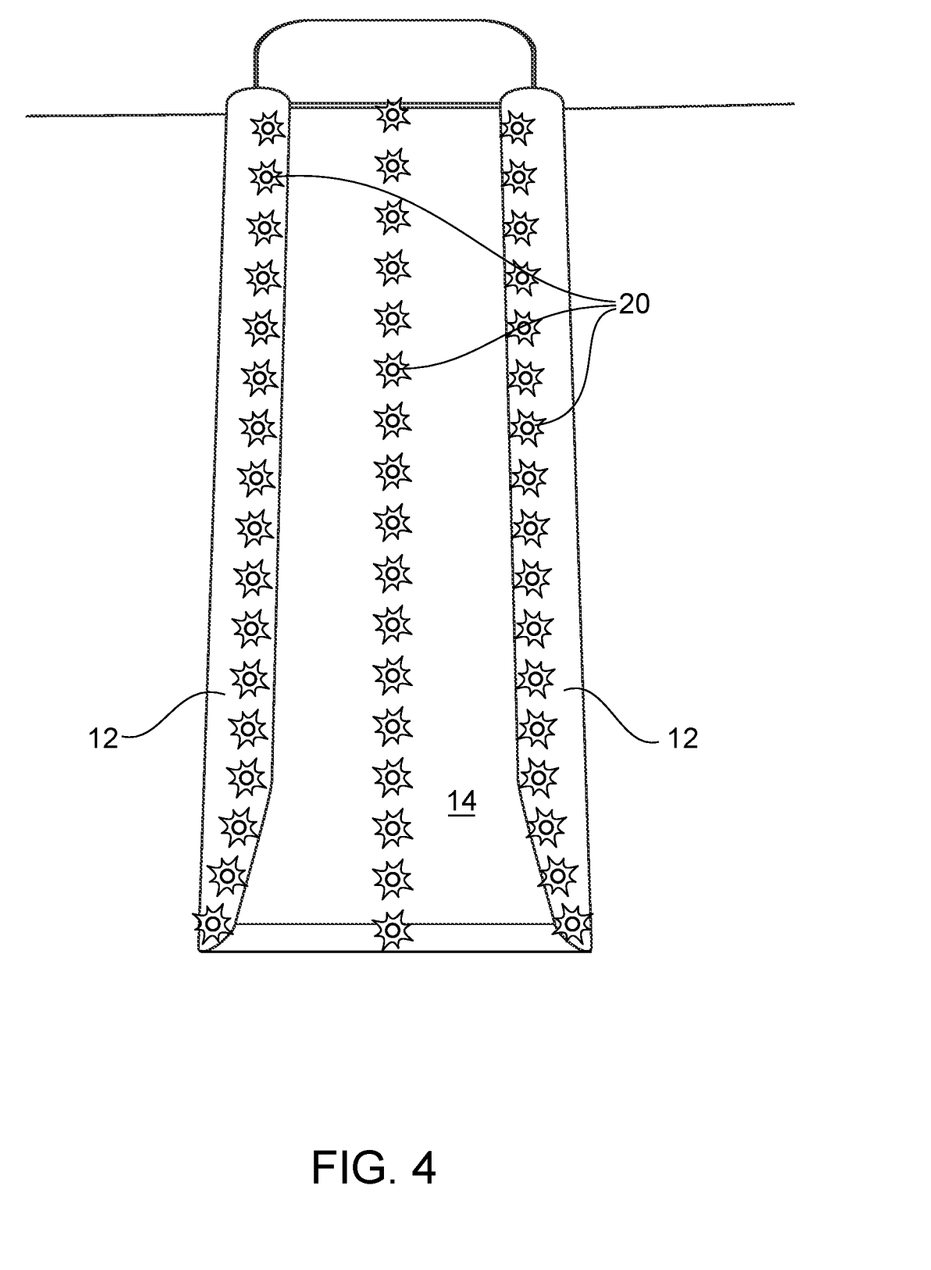
FIG. 4 is a perspective view of an evacuation slide with a series of chasing lights extending down both side tubes and extending down the sliding surface.
Figure 11:
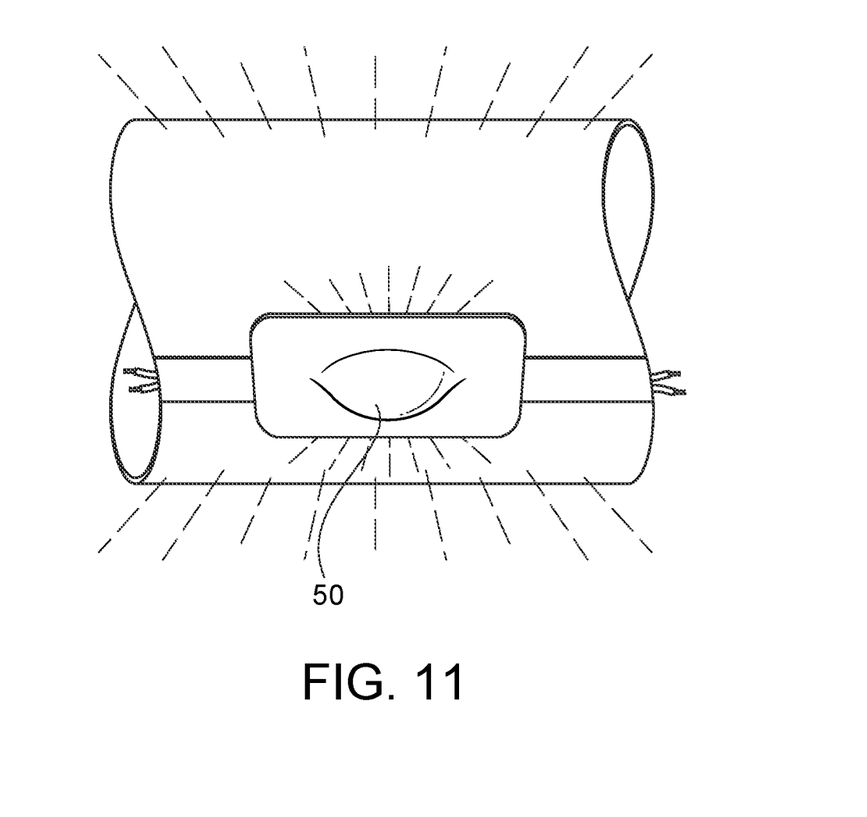
FIG. 11 is a side view of a light covered with a patch for protection.

Additionally or alternatively, it is possible to provide lights 20 along the sliding surface 14 of the evacuation system 10. FIG. 4 illustrates an evacuation slide with lights 20 extending down side tubes 12, as well as positioned along the sliding surface 14 itself. This option can help more fully illuminate the sliding surface 14, further preventing evacuee hesitation. In this embodiment, it is possible to provide the sliding surface 14 with a thickened surface that can support the lights 20. For example, the lights 20 may be embedded between two sliding surface layers. In an alternate embodiment, the sliding surface may be impregnated or coated with a protective layer that can help secure the lights in place. The impregnated or coated protective layer can also help protect the lights 20 from sliding friction. In some examples, the lights may be encapsulated in a sleeve, sealed to the sliding surface, covered by one or more patches, or attached to the surface in any other appropriate manner. An example of a light covered by a protective patch 50 is illustrated by FIG. 11. The patch will generally be translucent or transparent, such that light can shine therethrough for use, while still protecting the secured light.

Figure 5:
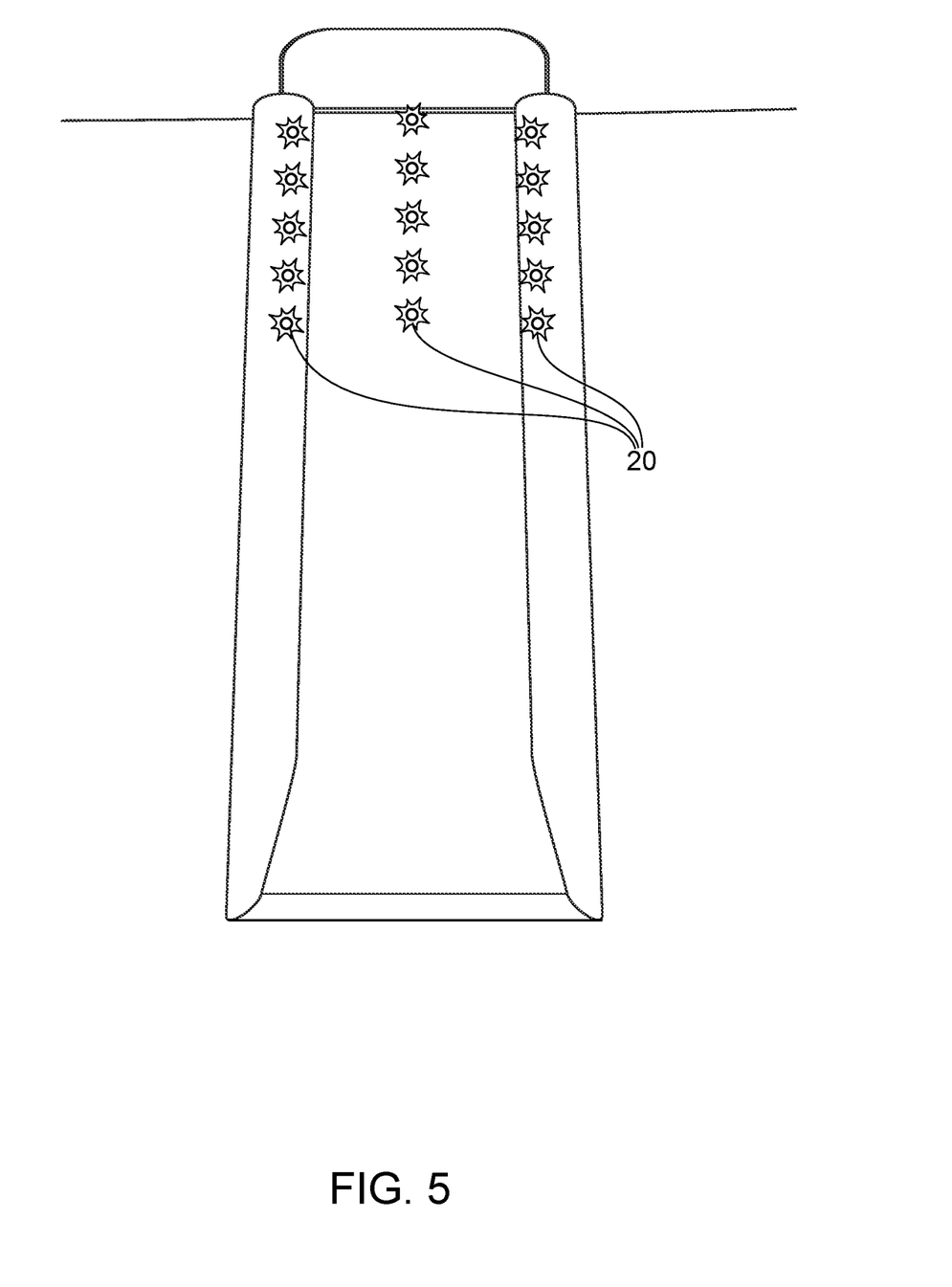
FIG. 5 is a perspective view of an evacuation slide with a series of chasing lights extending partially down both side tubes and partially down the sliding surface.

The lights may extend the entirety of the sliding surface 14, as shown by FIG. 4. The lights may extend only a portion of the sliding surface 14, as shown by FIG. 5.

Figure 6:
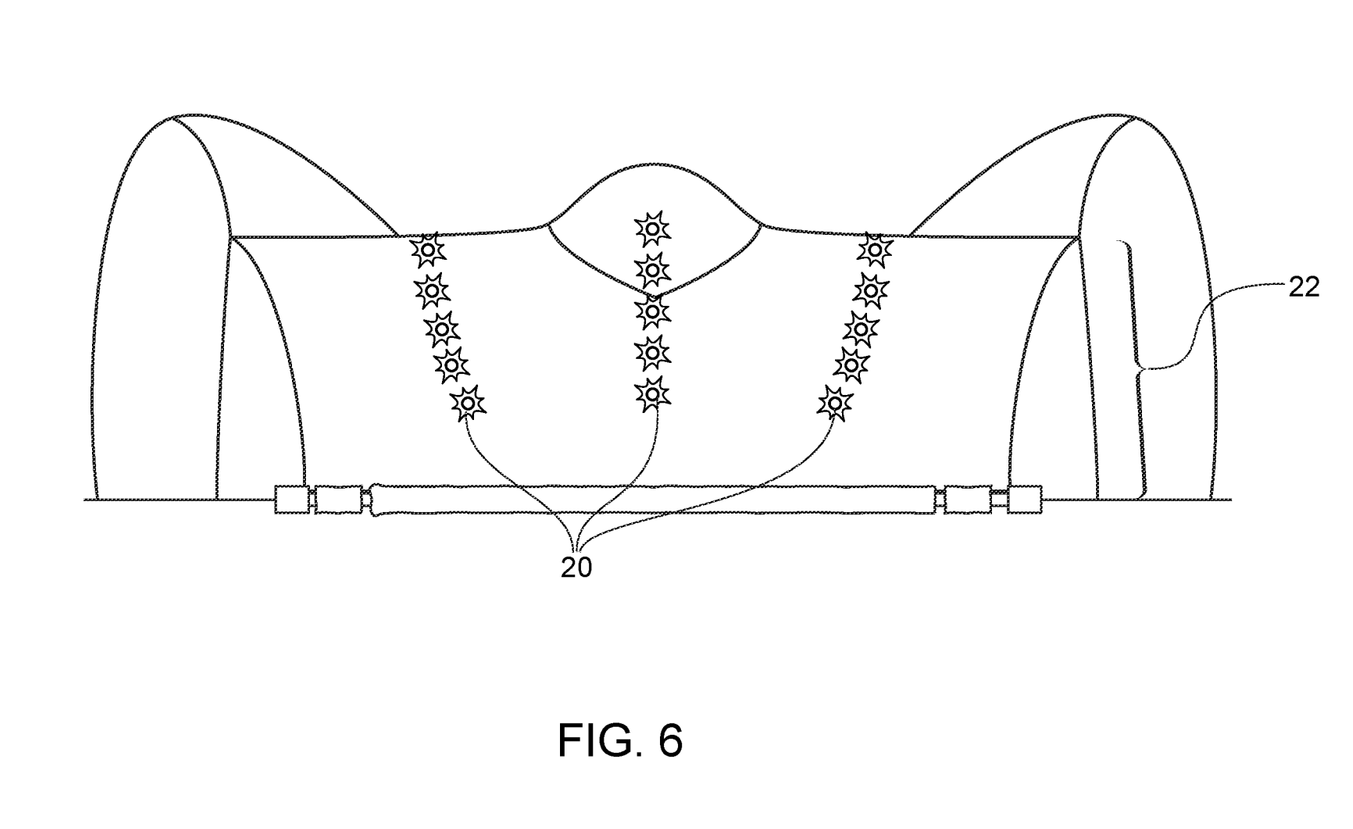
FIG. 6 is a perspective view of an evacuation slide with a series of chasing lights positioned at an entrance/sill end of the slide.
Figure 7:
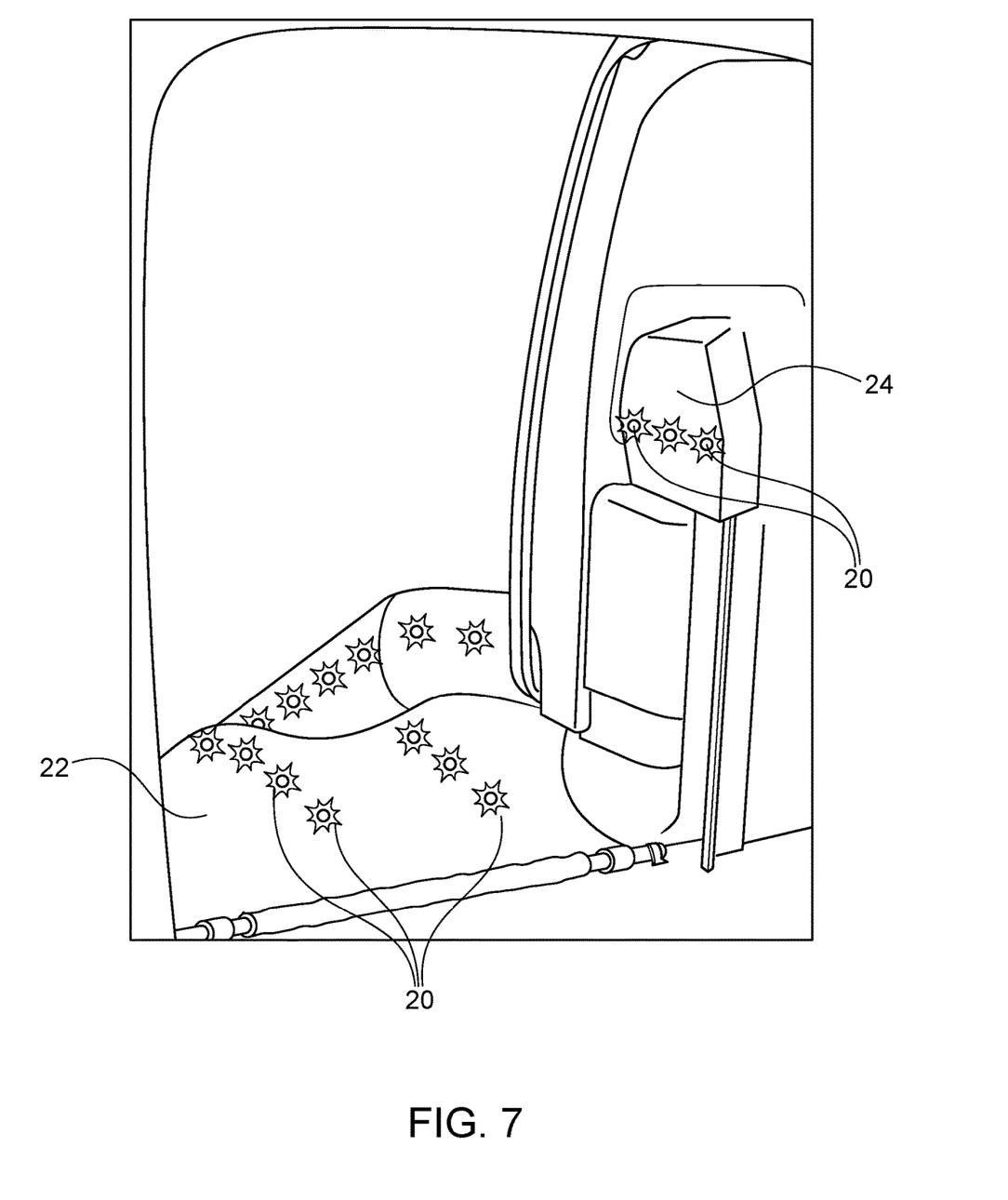
FIG. 7 is a perspective view of an evacuation slide with a series of chasing lights at the entrance of the slide, as well as internally inside the aircraft.
Figure 8:
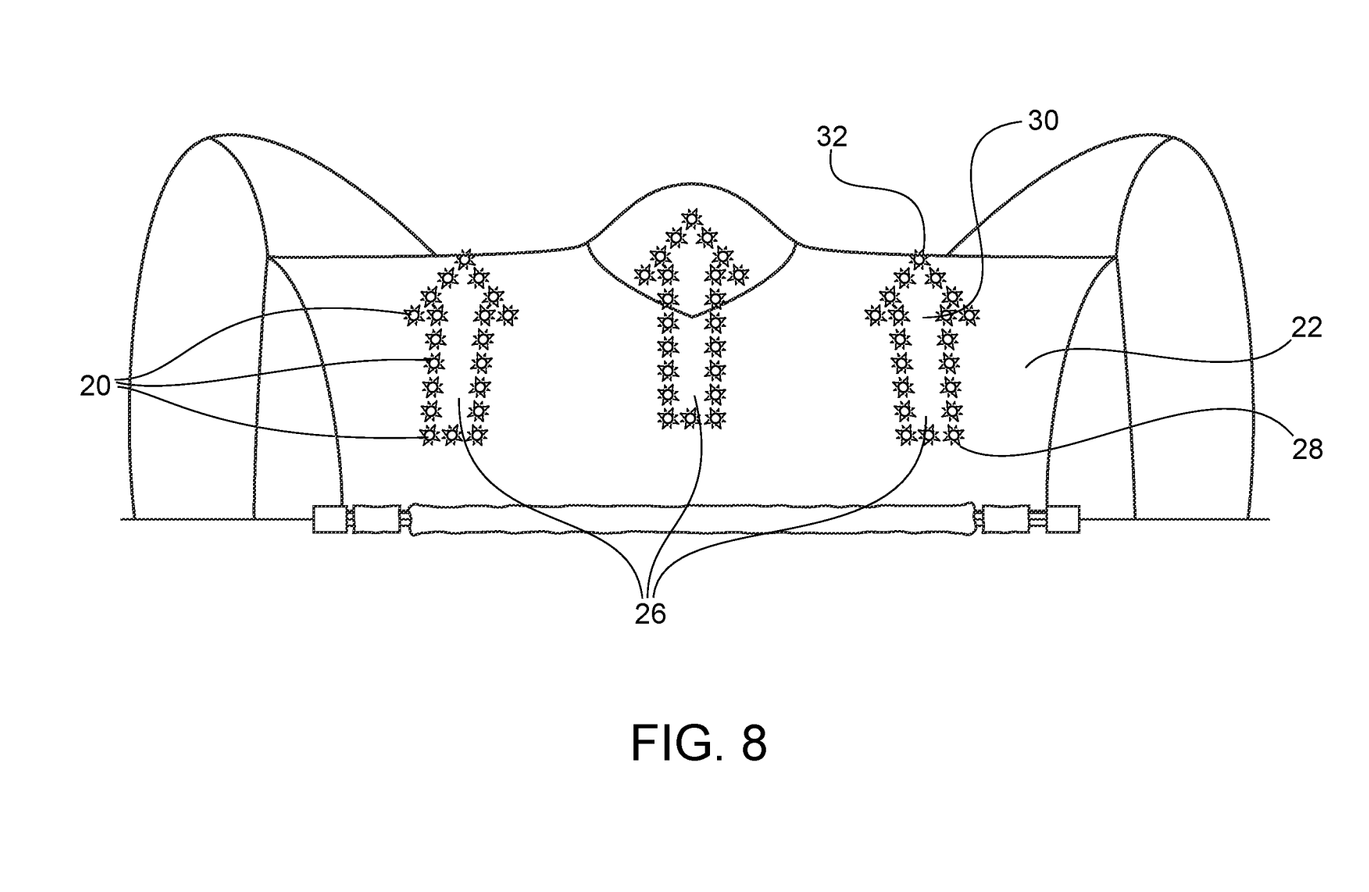
FIG. 8 is a perspective view of an evacuation slide with a series of chasing lights forming the shape of a directional marking.
Figure 9:
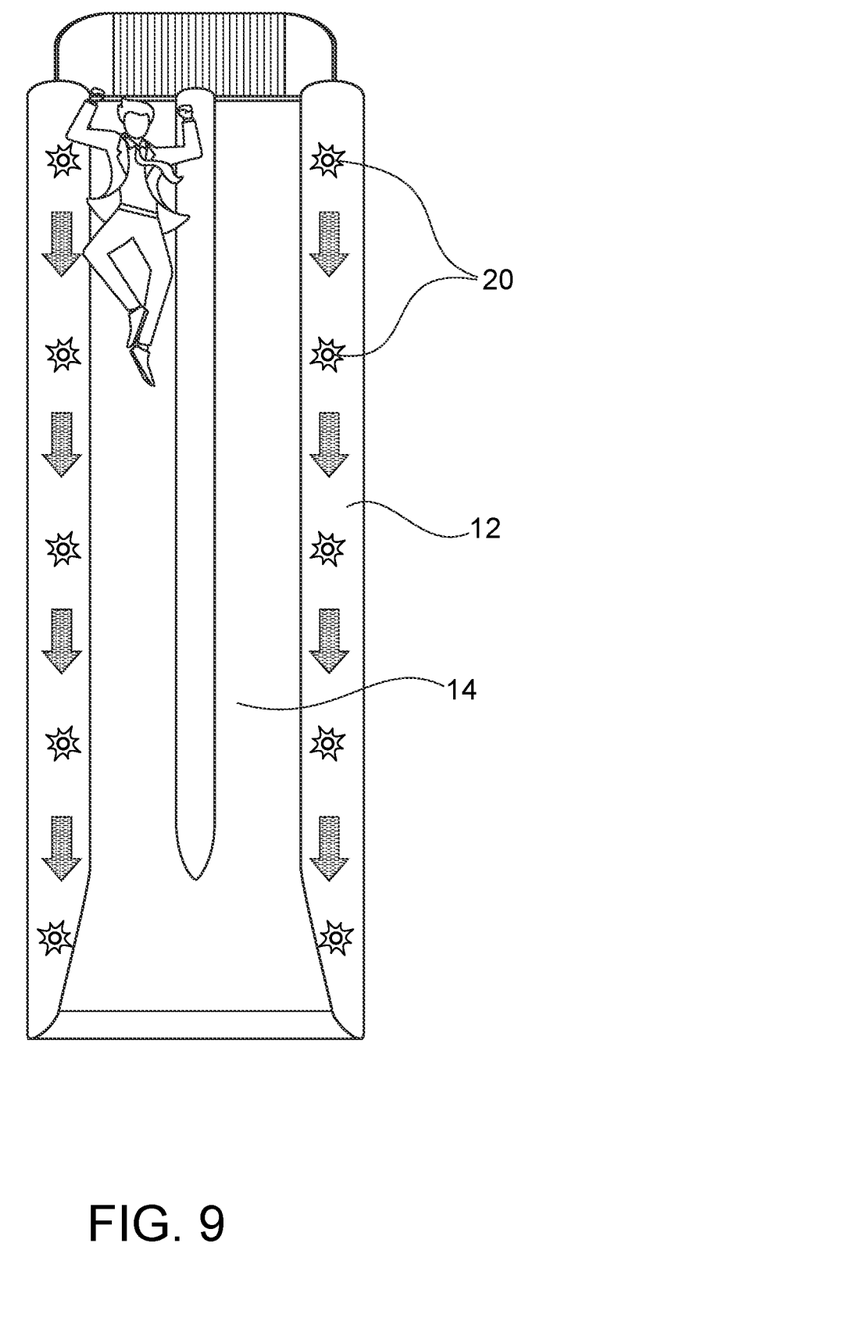
FIG. 9 is a front plan view of an evacuation slide with embodiments of the disclosed lighting system in use.

FIG. 6 illustrates an embodiment in which the lights 20 are mounted in the area 22 immediately outside an open aircraft door. FIG. 7 illustrates an embodiment in which the lights are mounted inside the interior of aircraft structure 24, as well as in the area 22 outside the open door. For example, lights 20 may be positioned along an interior of the exit door area. These lights 20 may also have the running/chasing pattern described herein. FIG. 8 illustrates an embodiment that has directional markings 26 in the area 22 outside an open aircraft door. In the example shown, the directional markings 26 are in the shape of arrows. A single arrow may be provided or multiple arrows may be provided, as shown. It should be understood, however, that other types of directional markings may be used. Non-limiting examples include footprints indicating to evacuees where to stand, images of a person running indicating to evacuees to continue moving, a hand with a finger extended, a bull's-eye or target image, or any other option determined to help direct evacuees. Any combination of these options is possible. Exemplary combinations can include the lights set up in the shape of a plurality of way-finding arrows or pointing indicators to further help identify the direction for evacuees to take. FIG. 9 illustrates an evacuee using an evacuation slide with the disclosed lighting system.

The directional markings 26 may be formed by the lights 20 disclosed herein. The lights that form the directional markings 26 may flash brightly and quickly in sequential order from the doorway towards the slide end. In the arrow example, the lights at the base 28 of the arrow 30 may blink at a different speed than the lights at the tip 32 of the arrow. The lights at the base 28 of the arrow 30 may blink at a different brightness than the lights at the tip 32 of the arrow. The lights at the base 28 of the arrow 30 may blink at a different color than the lights at the tip 32 of the arrow. Any combination of these options is possible. These varied rhythms or patterns can help direct an evacuee toward the slide entrance.

In any of the described embodiments, the rhythm or pattern of the lights may be altered as desired. The rhythm or pattern may be altered based on the lighting conditions experienced during evacuation. The rhythm or pattern may decrease toward the exit of the slide. It is also possible to provide lights with brightness that decreases for the exit of the slide. Additionally or alternatively, it is possible to provide lights of varying colors. In one example, the lights 20 are LED lights.

Figure 10:
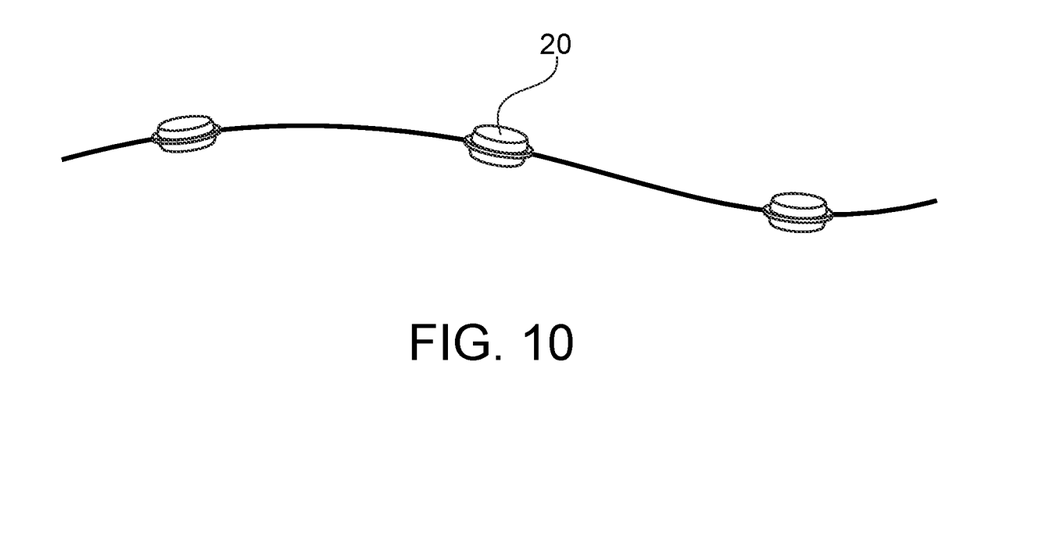
FIG. 10 is a side perspective view of one embodiment of a set of wired lights that may be installed on an evacuation system.

The lights may be powered in various ways. For example, the lights may be powered by aircraft power. In another example, the lights may be powered by a separate, autonomous battery system. The separate battery system may be an alkaline or lithium battery system. The separate battery system may be solar-powered. The battery system connection may be positioned or mounted within the slide itself, with all lights sharing a single battery system. For example, the battery system may be attached to the inside or top of the evacuation slide's top tubes. The lights may be wired in series or in parallel to multiple lights with a single power source. The lights may also be self-contained and powered by an individual battery for each light source. One example of a string of lights is illustrated by FIG. 10.

Various methods for activation of the lights 20 may be used. In one example, a lanyard may be pulled from a battery during evacuation slide deployment, activating the running/chasing lights 20.

Various types of lights may be used for the chasing lights. In one example, the lights are LEDs that are 10× Magnified White Luminaries. In the same or a different example the lights may be LEDs that are Cree Xlamp or other high-lumen LEDs, using 2.85 V for a $V_f$ of high efficacy XT-E White. It is generally desirable to use a light source that can provide a visual mode of communication to evacuees in order to quickly indicate the expected evacuation behavior in any lighting condition. Bright, strobing lights can provide a benefit in both day and night lighting conditions—helping to increase the evacuation rate in any ambient lighting situation. A linear strobing affect can also be beneficial in that it provides a wayfinding function.

The light sources flash quickly in sequence, conveying an appearance of flowing from the door sill all the way down the evacuation slide. In one example, lights are staggered to stay lit for about 0.5 seconds, with a first adjacent or neighboring light to flash on as soon as the second adjacent or neighboring lights has flashed off. Other time options or intervals are possible and considered within the scope of this disclosure. This ON/OFF sequence is meant to give visual cues, creating the appearance of "chasing" lights down (or up) the slide, which can help educate evacuees as to what is expected as they reach the evacuation device.

In a further embodiment, the lights 20 can be combined with audio signals, letting the evacuees know to "GO" once the evacuation slide is deployed. The audio signals could be timed to coincide with various rhythms or patterns of the chasing lights.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A lighting system for use on an aircraft evacuation system having
    side tubes and a sliding surface, the lighting system comprising:
    a plurality of lights positioned along at least one side tube, along the sliding surface, at an entrance/sill end, at an exit/runway end, along a porch, along a walking surface, along a ramp that leads to the sliding surface, or any combination thereof, wherein the plurality of lights sequentially change one or more property of light emitted in order to give the appearance of lights traversing the evacuation system,
    wherein the plurality of lights form a shape of one or more arrows,
    wherein at least one of the one or more arrows is positioned at an entrance/sill end near an aircraft door,
    wherein each of the one or more arrows has an arrow base and an arrow tip, with the arrow tip pointing toward an aircraft evacuation slide exit/runway end,
    with a first adjacent light to flash on as soon as a second adjacent light has flashed off, giving the appearance of lights of each arrow flowing from the arrow base to the arrow tip.

2. The lighting system of claim 1, wherein the one or more property of light emitted constitutes a differing illumination state, brightness, color, or any combination thereof.

3. The lighting system of claim 1, wherein the plurality of lights change one or more property of light emitted sequentially in a direction of evacuation or in a direction opposite of evacuation.

4. The lighting system of claim 1, wherein at least one of the one or more arrows is positioned along the sliding surface of the aircraft evacuation system from the entrance/sill end to the exit/runway end of the evacuation system slide.

5. The lighting system of claim 1, wherein the evacuation system comprises an evacuation slide with a single sliding lane, and wherein the plurality of lights are positioned along both side tubes of the single sliding lane.

6. The lighting system of claim 1, wherein the evacuation system comprises an evacuation slide with dual sliding lanes, and wherein the plurality of lights are positioned along both side tubes of the dual sliding lanes.

7. The lighting system of claim 6, wherein the dual sliding lanes are separated by a central divider, and wherein the plurality of lights are positioned along the central divider.

8. The lighting system of claim 1, wherein the plurality of lights are positioned inside the at least one side tube, outside the at least one side tube, or a combination thereof.

9. The lighting system of claim 1, wherein the plurality of lights are positioned along the sliding surface of the evacuation system.

10. The lighting system of claim 1, wherein the plurality of lights take on a linear strobe effect, flashing in a cascading sequence.

11. The lighting system of claim 10, wherein the plurality of lights illuminate sequentially, such that lights at the entrance/sill end blink at a different time or interval than the lights at the exit/runway end.

12. The lighting system of claim 1, wherein the plurality of lights are configured to flash sequentially in sequence in a direction of evacuation and are configured to flash on and off about every 0.5 seconds.

13. The lighting system of claim 1, wherein the lights of the one or more arrows illuminate sequentially, such that lights at the arrow base blink at a different time or interval than lights at the arrow tip.

14. The lighting system of claim 1, further comprising an audio component.

15. A method of directing evacuees during use of an evacuation system, comprising:
   providing the lighting system of claim 1 on the evacuation system;
   activating sequential change in illumination, brightness, color, or any combination thereof.

* * * * *